Dec. 22, 1953   N. D. DAVIDSON ET AL   2,663,213
LUBRICATED WING NUT
Filed Oct. 24, 1950

INVENTORS
NOLAND D. DAVIDSON
ERSKINE J. HENDERSON
BY
McMorrow, Berman & Davidson
ATTORNEYS Patented Dec. 22, 1953

2,663,213

UNITED STATES PATENT OFFICE 2,663,213

LUBRICATED WING NUT

Noland D. Davidson, Ellisville, and Erskine J. Henderson, Laurel, Miss.; said Henderson assignor of one-fourth to Fred Walters, Laurel, Miss.

Application October 24, 1950, Serial No. 191,806

1 Claim. (Cl. 85—32)

This invention relates to improvements in lubricated wing nuts, and more particularly to an improved spare tire support structure for motor vehicles, said structure being of the type employing a detachable wing nut for supporting the tire carrier.

A main object of the invention is to provide a novel and improved wing nut for use in spare tire-supporting structures for motor vehicles, said wing nut device being easy to mount, being secured to the frame of the spare tire-supporting structure so that it cannot be lost, and being arranged so that no damage can occur to the threads of the supporting bolt employed with the tire support.

A further object of the invention is to provide an improved spare tire-supporting structure for motor vehicles, said structure being of the type employing a detachable nut for supporting the tire carrier element of the structure, the structure being arranged so that the supporting nut cannot be lost, the threads of the supporting bolt of the structure being protected by a special arrangement of the supporting nut, and means being provided for lubricating the threads of the supporting nut and the supporting bolt of the structure, whereby the nut may be readily detached whenever it is necessary to change a tire.

Further objects and advantages of the invention will become apparent from the following description and claim, and from the accompanying drawings, wherein:

Figure 4:
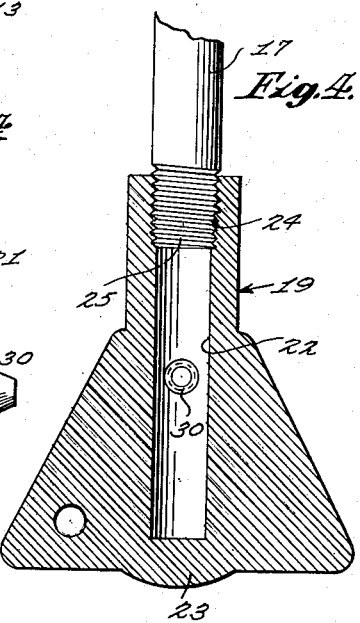
Figure 4 is a cross-sectional view taken on the line 4—4 of Figure 3, showing the engagement of the wing nut on the supporting bolt of the tire carrier.
Figure 7:
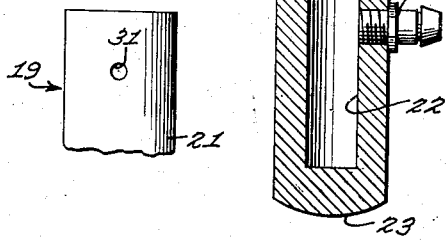
Figure 7 is an elevational detail view taken on the line 7—7 of Figure 5.
Figure 5:
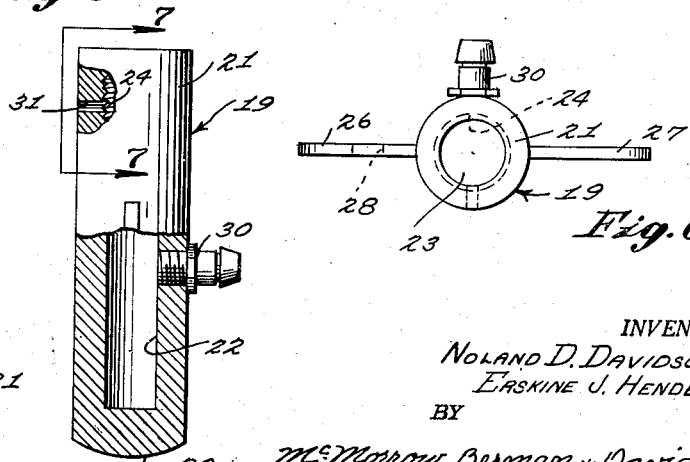
Figure 5 is a cross-sectional view taken on the line 5—5 of Figure 2.
Figure 6:
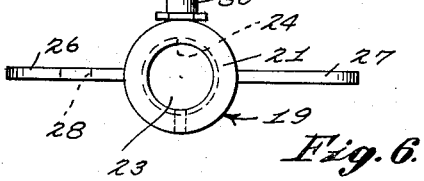
Figure 6 is a top plan view of the wing nut shown in Figures 2, 3 and 5.

Referring to the drawings, 11 generally designates the frame of a motor truck or other motive vehicle, said frame being provided with a lower portion, designated at 12, and with a spare tire carrier 13 hinged at 14 to a depending arm 15 pivotally connected to one end of the portion 12 at 16. Designated at 17 is a bolt pivotally connected at 18 to the other end of the frame portion 12, said bolt 17 extending through the carrier 13 and being provided with a wing nut 19 threaded onto its end, as shown in Figures 1 and 4, whereby the carrier 13 is supported in a horizontal position and whereby a spare tire 20 may be supported on the carrier 13.

The wing nut 19 comprises a tubular body 21 which is formed with an axial bore 22, the body being provided with a bottom wall 23 whereby the lower end of the bore 22 is closed off. The upper end of the bore 22 is formed with the internal threads 24 which are engageable with the threaded end 25 of the bolt 17. Designated at 26 and 27 are respective radial wings or flanges secured in diametrically opposite positions to the tubular body 21. The wing 26 is formed with an aperture 28 to which may be attached one end of a chain 29, as shown in Figure 1, the other end of the chain being attachable in any suitable manner to the frame of the vehicle above the bolt 17. If so desired, the chain 29 may be attached to the frame of the vehicle by means of a suitable lock, whereby the wing nut 19 may not be unthreaded from the end of the bolt 17 unless the lock is removed.

Designated at 30 is a conventional grease fitting which is provided in the wall of the tubular body 21 substantially at the intermediate portion of the bore 22, said fitting communicating with the interior of the bore 22 and providing a means of filling said interior with grease. The grease is employed in order to lubricate the threads 24 and the threads on the end 25 of bolt 17, whereby the wing nut 19 may be readily removed whenever it is necessary to change a tire. Designated at 31 is an aperture formed in the internally threaded portion of the body 21, whereby excess grease may be allowed to escape from the interior of the body 21 when the nut is screwed up on the bolt 17.

Figure 1:
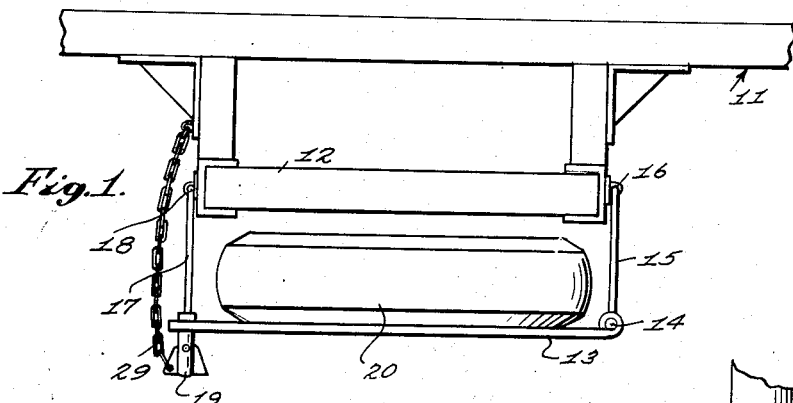
Figure 1 is a fragmentary rear view of the lower portion of the frame of a motor truck showing a spare tire-supporting structure provided with the improved wing nut device, and illustrating the arrangement of the present invention.
Figure 2:
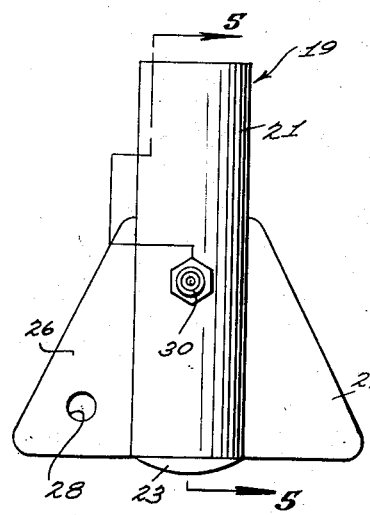
Figure 2 is an enlarged front elevational view of the improved wing nut employed in Figure 1.
Figure 3:
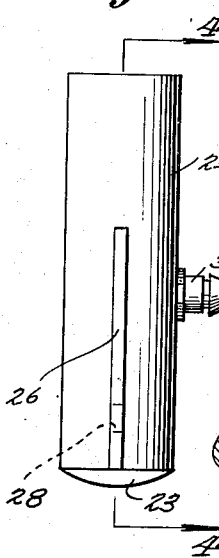
Figure 3 is a side elevational view of the wing nut of Figure 2.

It will be readily apparent that when the nut is engaged on the end of the bolt 17 in the manner shown, for example, in Figure 1, the threads on the end of the bolt are substantially covered and are protected against damage or rusting. The chain 29 secures the nut to the frame of the vehicle, so that said nut may not be accidentally lost, and, as above explained, the provision of said chain enables a suitable lock to be employed, whereby the nut 19 may not be disengaged from the bolt 17 unless the lock is opened.

Although a specific embodiment of an improved spare tire carrier arrangement and of an improved wing nut adapted to be employed therewith has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A nut of the character described comprising an elongated tubular body closed at its bottom end and formed with internal threads solely at its upper portion, a pair of diametrically opposite, substantially right triangular, downwardly flaring radial wings integrally formed on the lower portion of said body and terminating substantially at the lower end of said body, one of said wings being apertured, whereby a fastening member may be secured thereto, and a grease fitting secured to the intermediate portion of said body and communicating with the interior thereof a substantial distance below said internal threads, the internally threaded portion of said tubular body being formed at a substantial distance below the top end of said body with an aperture allowing grease to escape from said body below the end of a bolt when the body is threaded onto the bolt whereby excess lubricant is discharged from said body until the bolt has engaged a substantial number of the internal threads in said body, after which the lubricant is compressed by the bolt.

NOLAND D. DAVIDSON.
ERSKINE J. HENDERSON.

References Cited in the file of this patent

UNITED STATES PATENTS

| Number | Name | Date |
|---|---|---|
| 1,572,073 | Murphy | Feb. 9, 1926 |
| 1,574,578 | Holmes | Feb. 23, 1926 |
| 1,630,584 | Schneider | May 31, 1927 |
| 1,672,356 | Wasserfallen | June 5, 1928 |
| 1,707,622 | Berg | Apr. 2, 1929 |
| 1,926,834 | Campbell | Sept. 12, 1933 |
| 2,449,544 | Ballard | Sept. 21, 1948 |

FOREIGN PATENTS

| Number | Country | Date |
|---|---|---|
| 7,026 | Great Britain | May 19, 1910 |